(12) United States Patent
Wang

(10) Patent No.: US 12,093,197 B2
(45) Date of Patent: Sep. 17, 2024

(54) METHOD FOR SEARCHING FOR INTERRUPTED DEVICE, SLAVE DEVICE, MASTER DEVICE, AND STORAGE MEDIUM

(71) Applicant: ZTE CORPORATION, Shenzhen (CN)

(72) Inventor: Yuchen Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 91 days.

(21) Appl. No.: 17/997,157

(22) PCT Filed: Jun. 25, 2021

(86) PCT No.: PCT/CN2021/102427
§ 371 (c)(1),
(2) Date: Oct. 26, 2022

(87) PCT Pub. No.: WO2022/017121
PCT Pub. Date: Jan. 27, 2022

(65) Prior Publication Data
US 2023/0222075 A1 Jul. 13, 2023

(30) Foreign Application Priority Data

Jul. 22, 2020 (CN) .......................... 202010714129.4

(51) Int. Cl.
G06F 13/26 (2006.01)
G06F 9/48 (2006.01)
(52) U.S. Cl.
CPC ............ *G06F 13/26* (2013.01); *G06F 9/4818* (2013.01)

(58) Field of Classification Search
CPC .... G06F 13/26; G06F 9/4818; G06F 11/0793; G06F 11/079
See application file for complete search history.

(56) References Cited

U.S. PATENT DOCUMENTS

2008/0168243 A1 7/2008 Bychkov et al.
2008/0301408 A1 12/2008 Kranich
(Continued)

FOREIGN PATENT DOCUMENTS

CN 103092712 A 5/2013
CN 104038309 A 9/2014
(Continued)

OTHER PUBLICATIONS

Intellectual Property India. Examination Report for IN Application No. 202227062317 and English translation, mailed Jun. 27, 2023, pp. 1-8.
(Continued)

*Primary Examiner* — Phong H Dang
(74) *Attorney, Agent, or Firm* — Vivacqua Crane, PLLC

(57) ABSTRACT

A method for searching for an interrupted device, a slave device, a master device, and a storage medium. The method includes: connecting slave devices to a master device through a connection device; receiving, by the slave devices, task process information sent by the master device, where the task process information includes: task process information recorded by the master device and the corresponding slave devices when executing tasks; and when the receiving of task process information sent by the master device is interrupted, finding an interrupted slave device according to the interrupted task process information.

12 Claims, 10 Drawing Sheets

(56) References Cited

U.S. PATENT DOCUMENTS

| | | | | |
|---|---|---|---|---|
| 2010/0153602 A1* | 6/2010 | Kume | ............... | G06F 13/4226 |
| | | | | 710/110 |
| 2012/0005526 A1 | 1/2012 | Sela et al. | | |
| 2014/0365697 A1 | 12/2014 | Toyama | | |
| 2015/0378851 A1 | 12/2015 | Kobayasi | | |
| 2017/0339005 A1* | 11/2017 | Yuan | ............... | H04L 43/10 |
| 2018/0121373 A1 | 5/2018 | Qiu et al. | | |
| 2018/0157553 A1* | 6/2018 | Ryu | ............... | G06F 13/4282 |
| 2019/0294490 A1* | 9/2019 | Zhang | ............... | G06F 11/0793 |

FOREIGN PATENT DOCUMENTS

| | | |
|---|---|---|
| CN | 106294250 A | 1/2017 |
| CN | 107133086 A | 9/2017 |
| CN | 107451076 A | 12/2017 |
| CN | 108174374 A | 6/2018 |
| CN | 110673976 A | 1/2020 |
| KR | 20100036279 A | 4/2010 |
| KR | 20190029078 A | 3/2019 |
| WO | 2017197727 A1 | 11/2017 |

OTHER PUBLICATIONS

International Searching Authority. International Search Report and Written Opinion for PCT Application No. PCT/CN2021/102427 and English translation, mailed Sep. 28, 2021, pp. 1-12.

European Patent Office. Extended European Search Report for EP Application No. 21847194.4, mailed Aug. 18, 2023, pp. 1-8.

Korean Intellectual Property Office. First Office Action for KR Application No. 10-2022-7036823 and English translation, mailed Feb. 20, 2024, pp. 1-16.

* cited by examiner

METHOD FOR SEARCHING FOR INTERRUPTED DEVICE, SLAVE DEVICE, MASTER DEVICE, AND STORAGE MEDIUM

CROSS-REFERENCE TO RELATED APPLICATION

This application is a national stage filing under 35 U.S.C. § 371 of international application number PCT/CN2021/102427, filed Jun. 25, 2021, which claims priority to Chinese patent application No. 202010714129.4 filed Jul. 22, 2020. The contents of these applications are incorporated herein by reference in their entirety.

TECHNICAL FIELD

Embodiments of the present disclosure relate to, but not limited to, the field of device circuits, and in particular to, but not limited to, a method for searching for an interrupted device, a slave device, a master device, and a storage medium.

BACKGROUND

At present, the quality of USB cables and USB hubs available on the market varies, and some products are of low stability. As a result, during long-time connection and communication with a master device, an external USB slave device may be abnormally disconnected from the master device due to various reasons such as the power supply problem of the main board of the master device and the stability problem of the operating system. Especially in an unattended scenario where a large number of slave devices are linked to the master device, tasks such as a user copying an oversized file or connecting a mobile phone to execute other tasks are easily interrupted. If a large number of devices are connected by the user, it will be troublesome for the user to locate a device during troubleshooting, and the user cannot easily find a disconnected slave device according to a prompt in the operating system of the master device.

SUMMARY

A method for searching for an interrupted device, a slave device, a master device, and a storage medium are provided in the embodiments of the present disclosure.

According to an embodiment of the present disclosure, a method for searching for an interrupted device is provided, which is applicable to at least two external USB slave devices. The method includes: connecting the slave devices to a master device through a connection device, where the connection device includes at least two ports; receiving, by the slave devices, task process information sent by the master device, where the task process information includes: task process information recorded by the master device and the corresponding slave devices when executing tasks; and in response to interruption of receiving task process information sent by the master device, finding an interrupted slave device according to the interrupted task process information.

According to an embodiment of the present disclosure, a method for searching for an interrupted device is further provided, which is applicable to a master device. The method includes: connecting slave devices to a master device through a connection device; recording task process information of tasks executed by the slave devices and the master device; and sending, to the slave devices respectively, the task process information of the tasks executed by the master device and the corresponding slave devices, where the task process information sent to the slave devices respectively is used for finding, by the slave devices, according to received task information, an interrupted slave device, in response to an interruption of the task process information sent by the master device.

According to an embodiment of the present disclosure, an external USB slave device is further provided. The device includes a processor, a memory, and a communication bus, where the communication bus is configured for implementing connection and communication between the processor and the memory; and the processor is configured for executing one or more computer programs stored in the memory to implement the method for searching for an interrupted device described above.

According to an embodiment of the present disclosure, a master device is further provided. The master device includes a processor, a memory, and a communication bus, where the communication bus is configured for implementing connection and communication between the processor and the memory; and the processor is configured for executing one or more computer programs stored in the memory to implement the method for searching for an interrupted device described above.

According to an embodiment of the present disclosure, further provided is a computer-readable storage medium, storing one or more computer programs which, when executed by one or more processors, cause the one or more processors to implement the methods for searching for an interrupted device described above.

Additional features and advantages of the present disclosure will be set forth in the description which follows, and in part will be obvious from the description, or may be learned by the practice of the present disclosure.

DETAILED DESCRIPTION

Objects, technical schemes and advantages of the present disclosure will be clear from a detailed description of embodiments of the present disclosure in conjunction with the drawings. It should be understood that the specific embodiments described herein are merely used for illustrating this application, and are not intended to limit this application.

Example Embodiment One

The present disclosure provides a method for searching for an interrupted device, to solve the technical problem that when a large number of slave devices are connected to a master device and an external USB slave device is abnormally disconnected from the master device, the interrupted slave device cannot be found as soon as possible. The method for searching for an interrupted device provided in the present disclosure will be described below with reference to embodiments.

Figure 1:
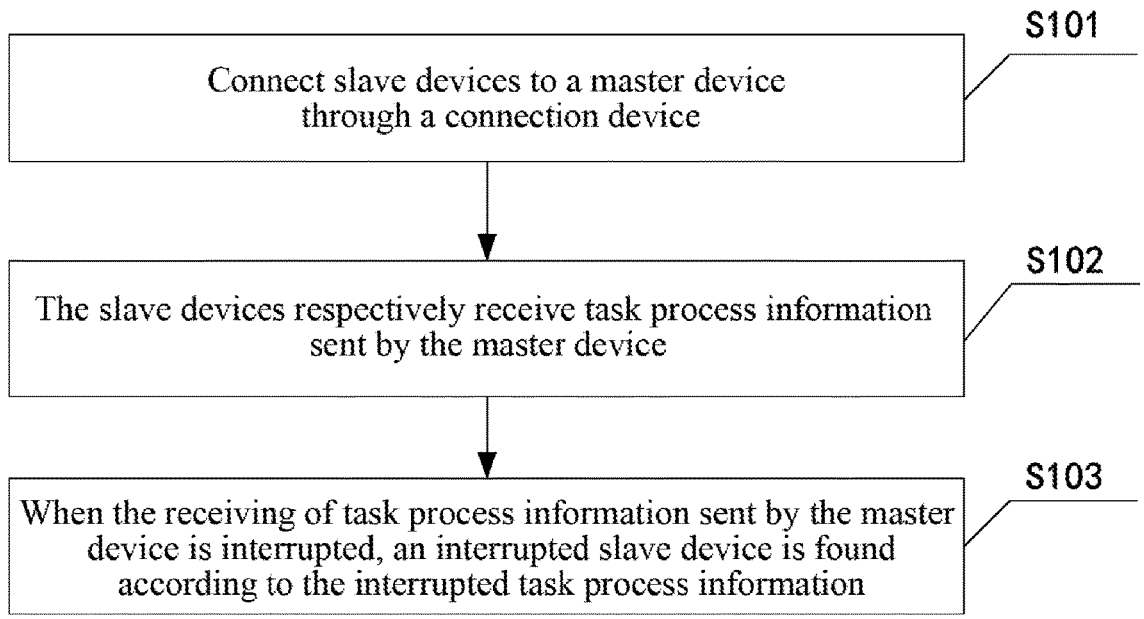
FIG. 1 is a basic flowchart of a method for searching for an interrupted device according to Example Embodiment One of the present disclosure.

Referring to FIG. 1, FIG. 1 is a basic flowchart of a method for searching for an interrupted device according to Example Embodiment One of the present disclosure. The method includes the following steps S101 to S103.

At S101, slave devices are connected to a master device through a connection device.

In this embodiment, this method is applicable to an external USB slave device, which may be a mobile phone, a camera, a printer, a smart watch, a tablet computer, etc. These devices are merely examples, and the above slave device is not limited thereto. The number of slave devices in this embodiment is at least two. The connection device may be a hub or an On-The-Go (OTG) connector. The connection device includes at least two ports configured for connecting to the slave devices.

In some embodiments, after the slave devices are connected through the connection device, a protection process may be started.

At S102, the slave devices receive task process information sent by the master device, respectively.

The task process information includes: task process information recorded by the master device and the corresponding slave devices when executing tasks; and the tasks executed may be copying a file, charging, controlling other tasks of the slave device, etc.

In some embodiments, the task process information includes: latest file size information recorded, file binary code, and task information.

In some embodiments, task startup information from the master device is received and sent to a protection process. Then task execution flags, i.e., the task process information, sent by the master device are continuously received.

In some embodiments, the task process information sent by the master device is received in at least one of the following manners: a Media Transfer Protocol (MTP) mode, an Android Debug Bridge (ADB) mode, Wi-Fi, a USB transfer control command or Small Computer System Interface (SCSI) command, or a TCP/IP communication connection to the master device established through a virtual Remote Network Driver Interface Specification (RNDIS) port of the slave device for information exchange. In this way, by adding a communication protocol based on the USB protocol, both the master device and the slave devices can obtain a status of a task, for example, the task being in progress or the task having been completed. If the master device is disconnected from the slave device before the task is executed, there is no need to restart the task after the connection is automatically restored. If the master device is disconnected from the slave device during execution of the task, the task may be re-executed after the connection is automatically restored.

Sending a USB transfer control or SCSI command is similar to establishing TCP/IP communication with the master device through the virtual RNDIS port of the slave device for information exchange, both of which require translation of information into binary instructions.

At S103, when the receiving of task process information sent by the master device is interrupted, an interrupted slave device is found according to the interrupted task process information.

In some embodiments, after connecting to the master device through the connection device, the method may further include: receiving port information of ports of the connection device through which the slave devices are connected to the master device, and forming a mapping relationship between the slave devices and the port information; and the finding at least one interrupted slave device according to the interrupted task process information further includes: finding the port information corresponding to at least one slave device according to the mapping relationship between the slave devices and the port information. The at least one slave device is an interrupted slave device. After the port information is received, the port information may be displayed on a screen of the slave device, so that the user can easily find the corresponding port.

In some embodiments, the finding the interrupted slave device according to the interrupted task process information further includes: independently detecting, by each slave device, the received task process information; when the task process information is not updated, determining a specific task corresponding to the task process information, finding a slave device expected to execute the specific task according to the task process information of the specific task, and determining the slave device as the interrupted slave device. In this embodiment, alternatively, when a detection is made that the task process information of a slave device is not updated, interruption prompt information may be displayed on a display of the slave device or a sound prompt may be emitted.

In some embodiments, after the finding the interrupted slave device according to the interrupted task process information, the method further includes: re-enumerating by the interrupted slave device or by an external device to restore a connection between the interrupted slave device and the master device. Re-enumerating by the interrupted slave device includes: switching a connection mode between the interrupted slave device and the master device; or, pulling down an electrical level of a Digital Positive (DP) signal line; or controlling the connection between the master device and the interrupted slave device through a digital relay in the interrupted slave device. The switched connection mode between the interrupted slave device and the master device may be one of the following: charging only, MTP mode, file transfer, image transfer, etc. The pulling down the level of the DP signal line may be forcibly pulling down the level through a USB controller of the slave device. The external device that re-enumerates the interrupted slave device to control the connection between the interrupted slave device and the master device may be a digital relay externally connected to the slave device.

In some embodiments, when the receiving of the task process information sent by the master device is interrupted, a detection is made as to whether the task process information of the interrupted slave device includes charging information only, and if yes, there is no need to re-enumerate the interrupted slave device. In this way, the slave device that is disconnected from the master device can automatically determine whether to re-establish a connection with the master device such as a PC. If the slave device is not executing a task with the PC, for example, charging only, the slave device does not need to re-establish a connection with the PC.

In some embodiments, when connecting to the master device, the slave device may automatically compensate for a voltage and current of a VCC line during re-enumeration to achieve a stable connection.

In some embodiments, the interruption of the receiving of the task process information from the master device includes: no task process information has been received from the master device within a preset time.

In some embodiments, when the interrupted slave device has been re-enumerated multiple times in multiple manners but the connection between the interrupted slave device and the master device is still not restored, the port information of the port through which the interrupted slave device is connected to the connection device may be displayed on the screen of the slave device to prompt the user, so that the user can take a corresponding action in a timely manner to solve technical problems caused by physical disconnection. A sound alarm may also be emitted when the connection with the master device is still not established after repeated enumerations.

In some embodiments, after the interrupted slave device is re-enumerated and the connection between the interrupted slave device and the master device is restored, the slave device continues to receive the task process information from the master device, and resumes the task from an interruption point. After completing the task, the slave device sends all obtained task process information to the master device, for verification by the master device. If the verification is successful, the task ends. If the verification fails, the task is re-executed, and task process information is sent to the slave device again. The completion of the task may be determined by a flag indicating completion of task execution received from the master device. When the slave device is connected to the master device through an OTG connector, the master device may record whether the task is completed, and the slave device re-executes the task when the connection is re-established.

In the method for searching for an interrupted device provided in the embodiments of the present disclosure, slave devices are connected to a master device through a connection device, and the slave devices receive task process information of tasks executed by the master device and the corresponding slave devices from the master device, so as to achieve effects including, but not limited to, that when a large number of external USB slave devices are abnormally disconnected from the master device, the interrupted slave devices can be found as soon as possible to facilitate troubleshooting by the user, thereby improving the efficiency of troubleshooting.

Example Embodiment Two

The method for searching for an interrupted device of the present disclosure achieves the effect that when a large number of external USB slave devices are abnormally disconnected from the master device, the interrupted slave devices can be found as soon as possible. For ease of understanding, the method of the present disclosure will be described below with reference to an application scenario.

Figure 2:
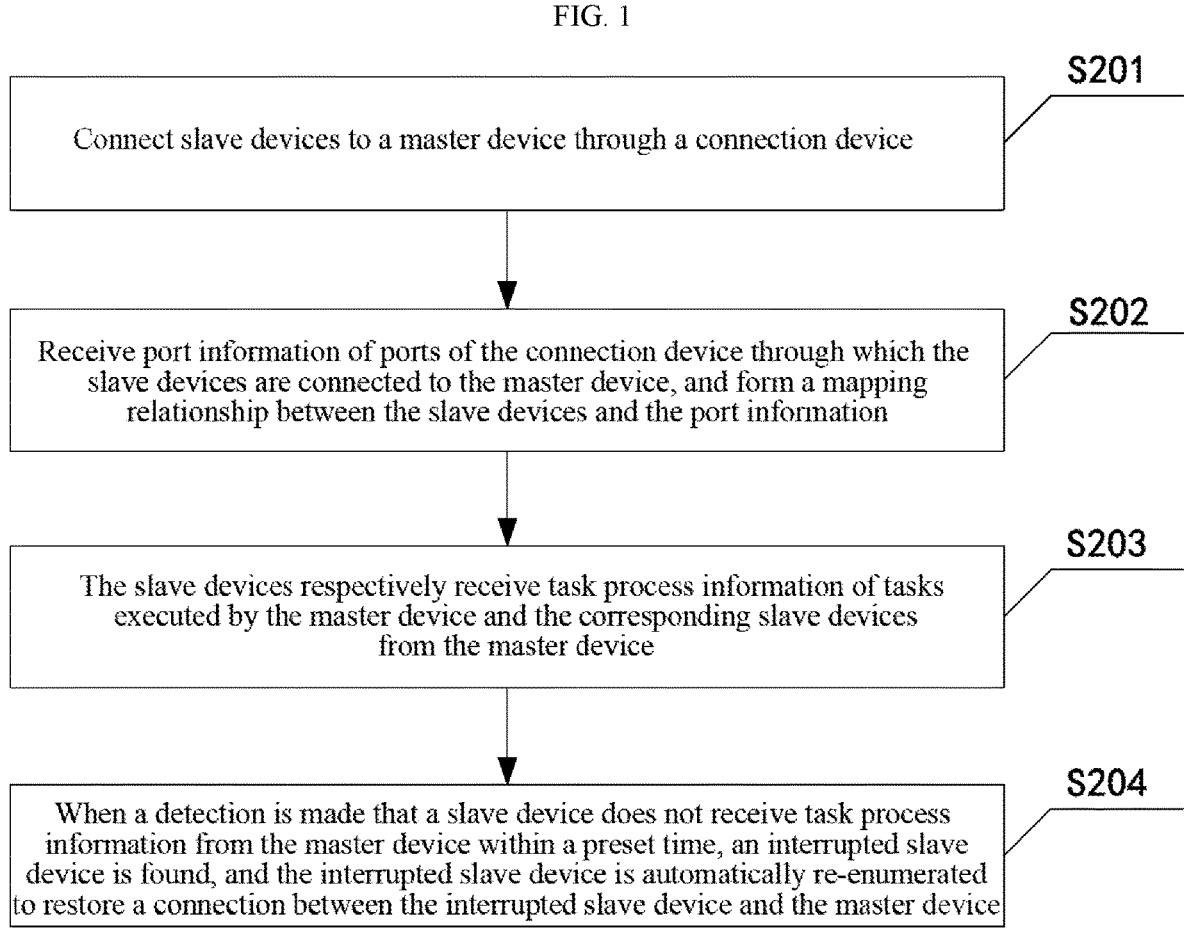
FIG. 2 is a detailed flowchart of a method for searching for an interrupted device according to Example Embodiment Two of the present disclosure.

FIG. 2 is a detailed flowchart of a method for searching for an interrupted device according to Example Embodiment Two of the present disclosure. The method includes the following steps S201 to S204.

At S201, slave devices are connected to a master device through a connection device.

In some embodiments, this method is applicable to an external USB slave device, which may be a mobile phone, a camera, a printer, a smart watch, a tablet computer, etc. These devices are merely examples, and the above slave device is not limited thereto. The number of slave devices in this embodiment is 200. The connection device may be a hub. The connection device includes at least 200 ports configured for connecting to the slave devices.

At S202, port information of ports of the connection device through which the slave devices are connected to the master device is received, and a mapping relationship between the slave devices and the port information is formed.

At S203, the slave devices respectively receive task process information of tasks executed by the master device and the corresponding slave devices from the master device.

In this embodiment, the task process information includes: latest file size information recorded, file binary code, and task information.

In this embodiment, the task process information sent by the master device is received in at least one of the following manners: an MTP mode, an ADB mode, Wi-Fi, a USB transfer control command or SCSI command, or a connection to the master device through a virtual RNDIS port of the slave device. In this way, by adding a communication protocol based on the USB protocol, both the master device and the slave devices can obtain a status of a task.

At S204, when a detection is made that a slave device does not receive task process information from the master device within a preset time, an interrupted slave device is found according to the interrupted task process information, and the interrupted slave device is automatically re-enumerated to restore a connection between the interrupted slave device and the master device.

In this embodiment, finding an interrupted slave device according to the interrupted task process information further includes: independently detecting, by each slave device, the received task process information; when the task process information is not updated, determining a specific task corresponding to the task process information, finding a slave device expected to execute the specific task according to the task process information of the specific task, and determining the slave device as the interrupted slave device. In this embodiment, alternatively, when a detection is made that the task process information of a slave device is not updated, interruption prompt information may be displayed on a display of the slave device or a sound prompt may be emitted.

Re-enumerating the interrupted slave device includes: switching a connection mode between the interrupted slave device and the master device; or, forcibly pulling down an electrical level of a DP signal line; or controlling the connection between the master device and the interrupted slave device through a digital relay in the interrupted slave device. The switched connection mode between the interrupted slave device and the master device may be one of the following: charging only, MTP mode, file transfer, image transfer, etc.

In the method for searching for an interrupted device provided in the embodiments of the present disclosure, slave devices are connected to a master device through a connection device, and the slave devices respectively receive port information of ports of the connection device through which the slave devices are connected. The slave devices receive task process information of tasks executed by the master device and the corresponding slave devices from the master device. When a detection is made that a slave device does not receive task process information from the master device within a preset time, an interrupted slave device is found according to the interrupted task process information, and the interrupted slave device is automatically re-enumerated to restore a connection between the interrupted slave device and the master device. In this way, when a large number of external USB slave devices are connected to the master device and there is a slave device abnormally disconnected from the master device, the interrupted slave device can be found as soon as possible, and the re-establishment of connection between the slave device and the master device is tried, so that the slave device can automatically resume the communication with the master device without attendance, to solve in a timely manner the problem of abnormal disconnection of the external USB slave device from the master device caused by problems such as the power supply problem of the main board of the master device and the stability problem of the operating system. In a scenario with a large number of devices, the user can quickly find a host port connected to an abnormal device based on the abnormal device, to quickly troubleshoot the problem.

Example Embodiment Three

The present disclosure provides a method for searching for an interrupted device, to solve the technical problem that when a large number of slave devices are connected to a master device and an external USB slave device is abnormally disconnected from the master device, the interrupted slave device cannot be found as soon as possible. The method provided in the present disclosure will be described below with reference to embodiments.

Figure 3:
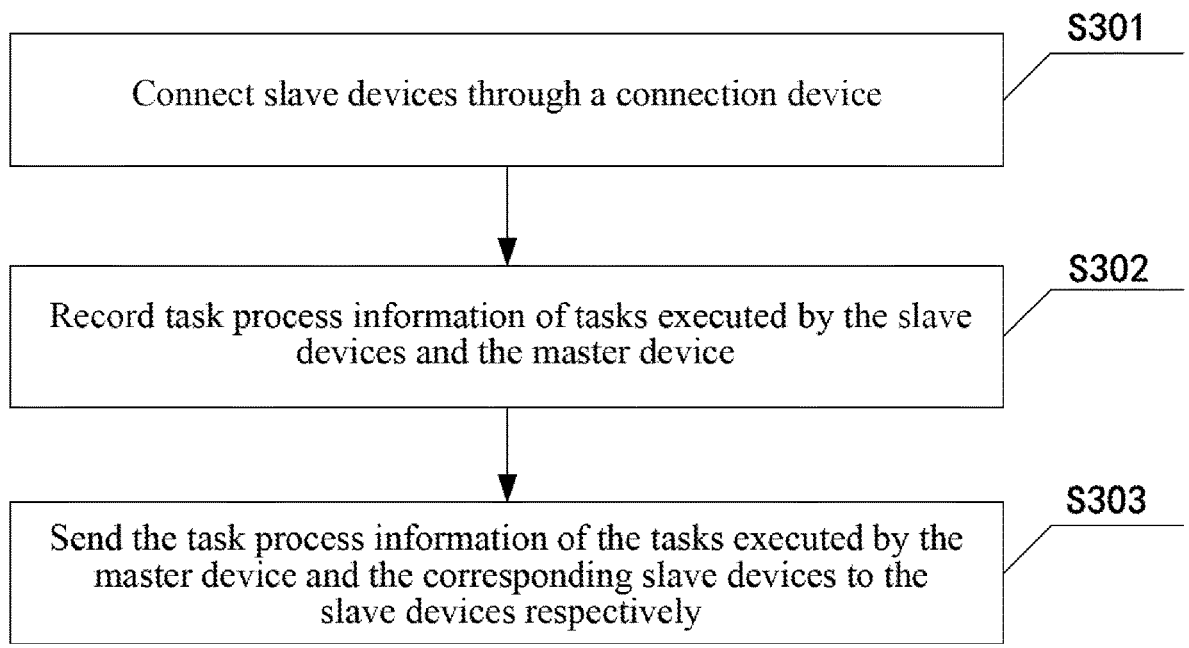
FIG. 3 is a basic flowchart of a method for searching for an interrupted device according to Example Embodiment Three of the present disclosure.

Referring to FIG. 3, FIG. 3 is a basic flowchart of a method for searching for an interrupted device according to Example Embodiment Three of the present disclosure. The method includes the following steps S301 to S303.

At S301, slave devices are connected through a connection device.

In this embodiment, this method is applicable to a master device. The master device may be a mobile phone, a smart watch, a computer, etc. These devices are merely examples, and the above master device is not limited thereto. The connection device may be a hub or an OTG connector.

In some embodiments, after the slave devices are connected through the connection device, a protection process may be started. After the slave devices are connected through a connection device, the method further includes: obtaining port information of ports of the connection device through which the slave devices are correspondingly connected to the master device; and sending the port information to the slave devices connected to the corresponding ports. The obtained port information of the ports of the connection device through which the slave devices are correspondingly connected to the master device may be displayed on a screen of the master device.

In some embodiments, obtaining port information of ports of the connection device through which the slave devices are correspondingly connected to the master device may further include: obtaining the port information and serial numbers of the slave devices corresponding to the port information; and binding the port information to the serial numbers of the corresponding slave devices and storing the bound port information and serial numbers in the master device. Information indicating the binding between the port information and the serial numbers of the corresponding slave devices may also be displayed on the screen of the master device.

At S302, task process information of tasks executed by the slave devices and the master device is recorded.

In some embodiments, the task process information of the tasks executed by the slave devices and the master device may be recorded in real time. The recording task process information of tasks executed by the slave devices and the master device may include: starting a task and sending startup information to a protection process on a slave device side. The master device continuously sends a task execution flag to the slave device. The task execution flag is the task process information, which includes: latest file size information recorded, file binary code, and task information.

It is to be noted that in some embodiments, the port information and serial numbers of the slave devices corresponding to the port information are obtained; and the port information and the serial numbers of the corresponding slave devices are bound and stored in the master device.

The recording task process information of tasks executed by the slave devices and the master device includes: binding the serial numbers of the corresponding slave devices and the port information respectively to the task process information corresponding to the tasks.

At S303, the task process information of the tasks executed by the master device and the corresponding slave devices is sent to the slave devices respectively.

It is to be noted that the task process information sent to the slave devices respectively may be used for finding, by the slave devices, at least one interrupted slave device according to received task information when the task process information sent by the master device is interrupted.

The finding, by the slave devices, an interrupted slave device according to received task information when the task process information sent by the master device is interrupted may further include: finding, by the master device, the serial number of a slave device bound to the task process information in the recorded task process information, to find the interrupted slave device according to the serial number. The master device may also find the port information of the port of the connection device through which the corresponding slave device is connected and to which the task process information is bound, and find a port position according to the port information.

Figure 4:
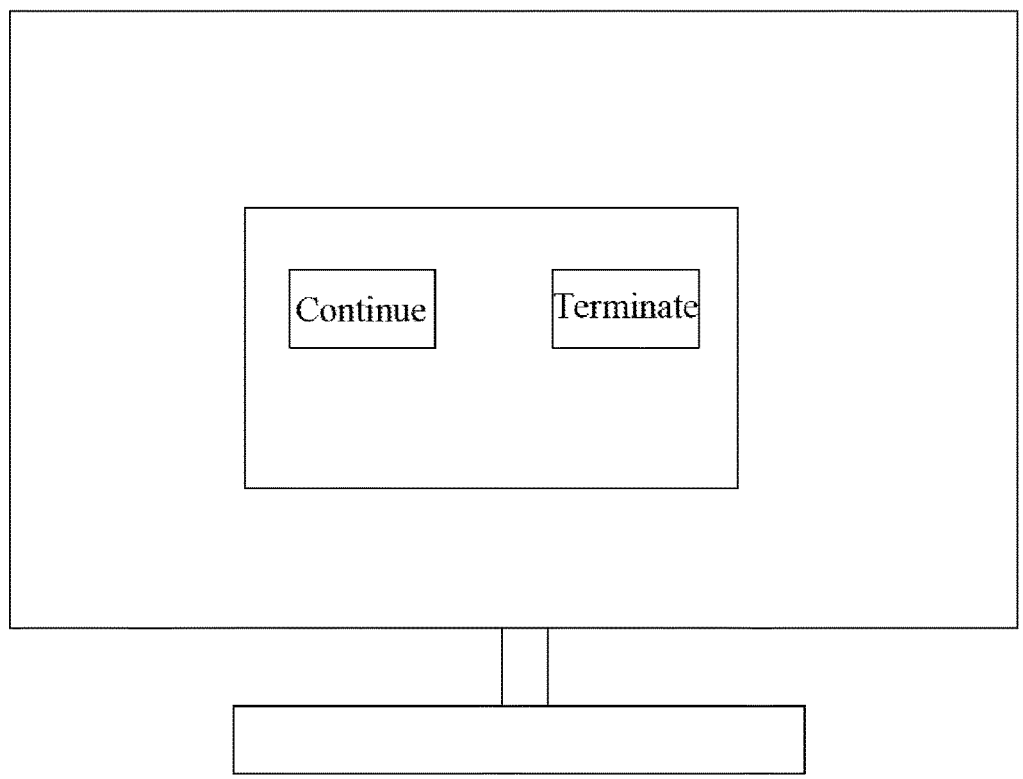
FIG. 4 is an interface diagram of a selection box displayed on a master device according to Example Embodiment Three of the present disclosure.
Figure 5:
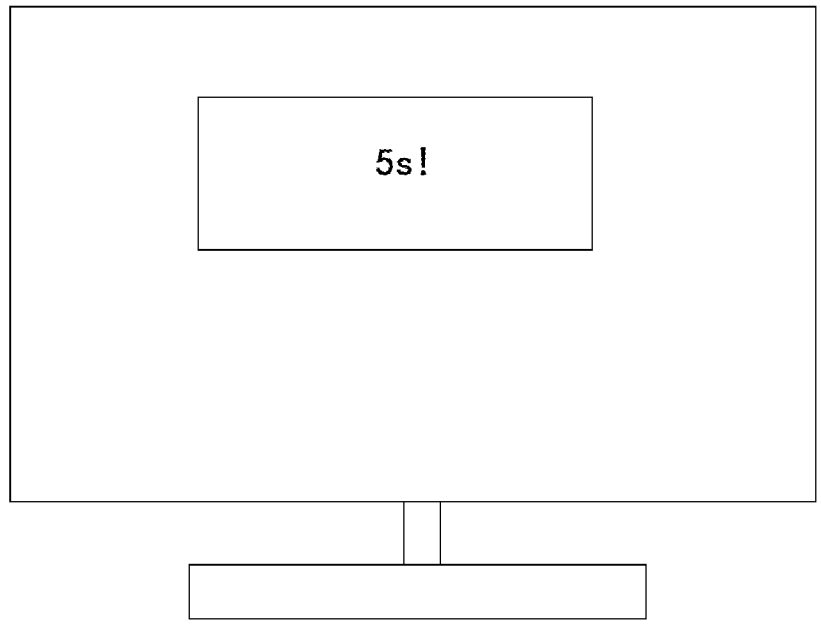
FIG. 5 is an interface diagram of a countdown prompt box displayed on a master device according to Example Embodiment Three of the present disclosure.
Figure 6:
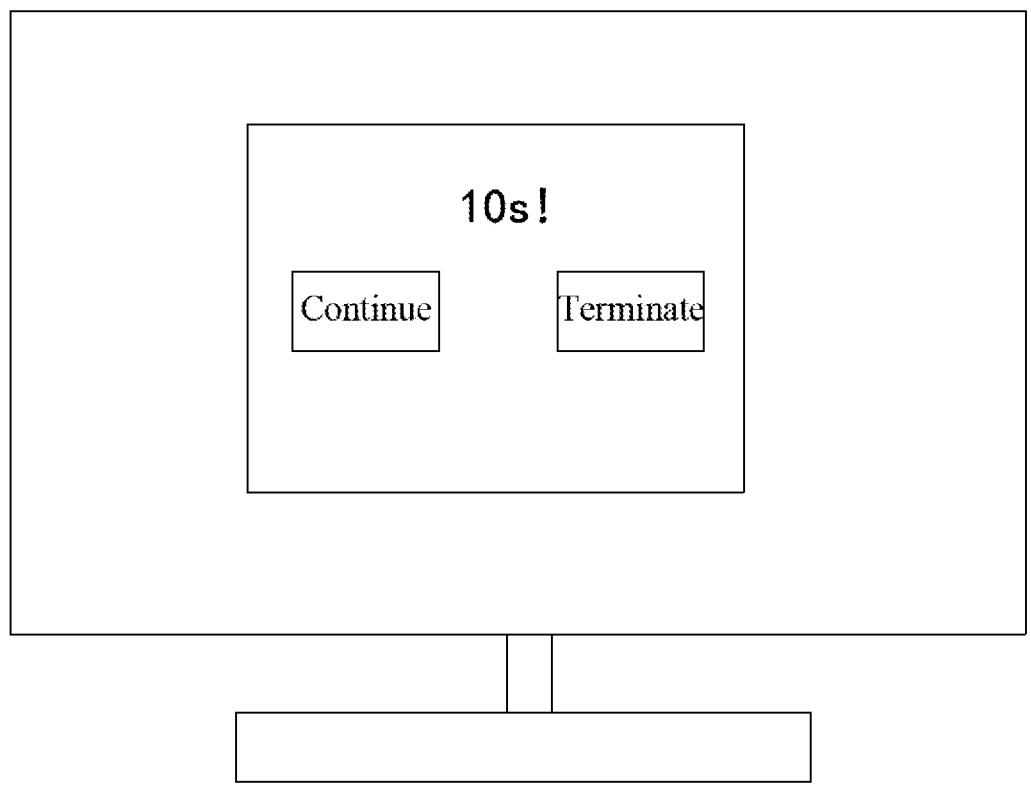
FIG. 6 is another interface diagram of a countdown prompt box displayed on a master device according to Example Embodiment Three of the present disclosure.

In some embodiments, when recording of the task process information of tasks executed by a slave device and the master device is abnormally interrupted, connection restoring between the interrupted slave device and the master device is waited for. That the recording of the task process information of tasks executed by a slave device and the master device is abnormally interrupted means that there is a slave device abnormally interrupted from the master device. When the connection between the interrupted slave device and the master device is restored, a selection box or a countdown prompt box is displayed on the master device. A condition for determining whether the connection between the interrupted slave device and the master device is restored may be: obtaining the serial number of the re-connected slave device, comparing the serial number with a serial number of a slave device that has not completed the task before to determine whether the two serial numbers are the same; and if yes, displaying the selection box or the countdown prompt box on the master device. The selection box may be as shown in FIG. 4, which presents prompts as to whether to continue or terminate. The countdown prompt is for the purpose of automatically continuing the task. The countdown prompt box may be as shown in FIG. 5, or may be as shown in FIG. 6. When the task is automatically continued after the countdown ends, the master device continues to record task process information in real time and send the task process information to the slave device in real time or according to a preset period, until the task ends. When the task ends, a task end flag may be sent to the slave device.

In some embodiments, after the task end flag is sent to the slave device, a verification file of the slave device is received. The verification file is task process data received by the slave device from the master device. The master device compares the verification data with task process data recorded by the master device. If the verification data is consistent with the task process data, the task ends. If the verification data is not consistent with the task process data, the task is re-executed.

In the method for searching for an interrupted device provided in the embodiments of the present disclosure, slave devices are connected to a master device through a connection device, the master device records task process information of tasks executed by the slave devices and the master device, and the master device sends the task process information of the tasks executed by the master device and the corresponding slave devices to the slave devices respectively, so as to achieve effects including, but not limited to, that when a large number of external USB slave devices are abnormally disconnected from the master device, the interrupted slave devices can be found according to the task process information as soon as possible.

Example Embodiment Four

The method for searching for an interrupted device of the present disclosure achieves the effect that when a large number of external USB slave devices are abnormally disconnected from the master device, the interrupted slave devices can be found as soon as possible. For ease of understanding, the method of the present disclosure will be described below with reference to an application scenario.

Figure 7:
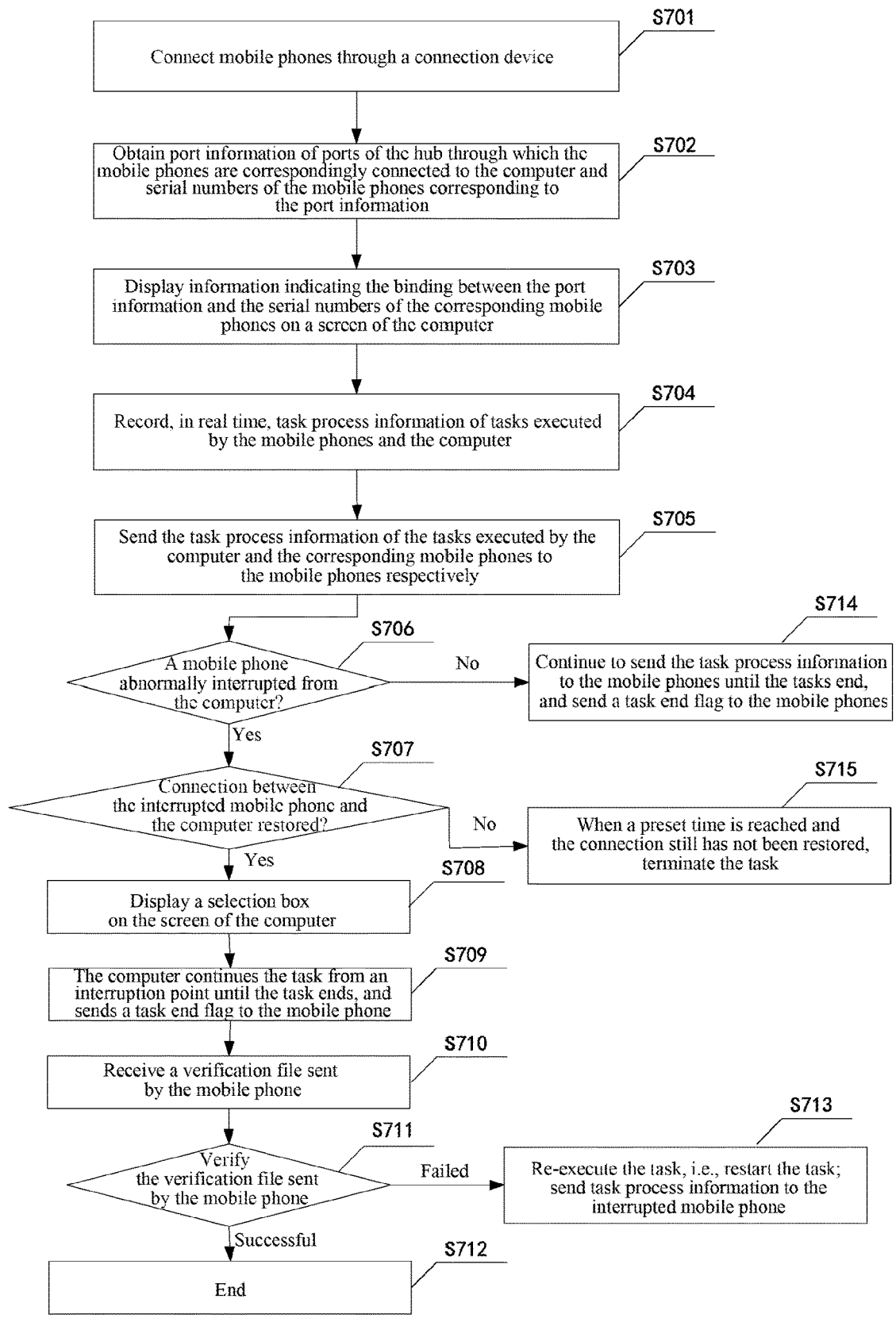
FIG. 7 is a detailed flowchart of a method for searching for an interrupted device according to Example Embodiment Four of the present disclosure.

FIG. 7 is a detailed flowchart of a method for searching for an interrupted device according to Example Embodiment Four of the present disclosure. The method includes the following steps S701 to S715.

At S701, mobile phones are connected through a connection device.

In this embodiment, this method is applicable to a master device. The master device is a computer. The connection device is a hub. The mobile phones are used as slave devices.

At S702, port information of ports of the connection device through which the mobile phones are correspondingly connected to the computer and serial numbers of the mobile phones corresponding to the port information are obtained.

At S703, information indicating the binding between the port information and the serial numbers of the corresponding mobile phones is displayed on a screen of the computer.

At S704, task process information of tasks executed by the mobile phones and the computer is recorded in real time.

The task execution flag is the task process information, which includes: latest file size information recorded, file binary code, task information, and a path.

At S705, the task process information of the tasks executed by the computer and the corresponding mobile phones is sent to the mobile phones respectively.

The task process information is task process information of the task performed by each of the mobile phones and the computer. When multiple mobile phones are connected to the computer, there are multiple pieces of task process information. Each mobile phone receives the task process information of the corresponding task executed by the mobile phone and the computer.

At S706, a detection is made as to whether there is a mobile phone abnormally interrupted from the computer.

In this embodiment, when there is a mobile phone abnormally interrupted from the computer, S707 is executed. When there is no mobile phone abnormally disconnected from the computer, S714 is executed.

At S707, a detection is made as to whether a connection between the interrupted mobile phone and the computer is restored.

When the connection is restored, S708 is executed. When the connection is not restored, S715 is executed.

At S708, a selection box is displayed on the screen of the computer.

The selection box includes two options: "Continue" and "Terminate". When the user clicks on "Continue", S709 is executed.

At S709, the computer continues the task from an interruption point until the task ends, and sends a task end flag to the mobile phone.

At S710, a verification file sent by the mobile phone is received.

At S711, the verification file sent by the mobile phone is verified.

When the verification file is consistent with the task process information recorded on the computer, it indicates that the verification is successful, and S712 is executed. When the verification fails, S713 is executed.

At S712, the process ends.

At S713, the task is re-executed, i.e., the task is restarted, and task process information is sent to the interrupted mobile phone.

At S714, the task process information of the tasks executed by the master device and the corresponding slave devices is continued to be sent to the slave devices until the task ends, and a task end flag is sent to the mobile phone.

At S715, when a preset time is reached and the connection still has not been restored, the task is terminated.

In the method for searching for an interrupted device provided in the embodiments of the present disclosure, mobile phones are connected to a computer through a hub. The computer obtains port information of ports of the connection device through which the mobile phones are correspondingly connected to the computer and serial numbers of the mobile phones corresponding to the port information, and displays information indicating the binding between the port information and the serial numbers of the corresponding mobile phones on a screen of the computer. Then, the computer records, in real time, task process information of tasks executed by the mobile phones and the computer, and sends the task process information of the tasks executed by the computer and the corresponding mobile phones to the mobile phones respectively. The computer detects whether there is a mobile phone abnormally interrupted from the computer, and when there is a mobile phone abnormally interrupted from the computer, reconnection of the interrupted mobile phone to the computer is waited for. After the interrupted mobile phone successfully reconnects to the computer, a selection box indicating whether to continue the task is displayed on the computer. After the user chooses to continue the task, the computer continues the task from an interruption point until the task ends, and sends a task end flag to the interrupted mobile phone. Then, the computer receives a verification file from the interrupted mobile phone. The computer compares the verification file with the task process information recorded on the computer. When the verification file is consistent with the task process information recorded on the computer, the computer terminates the task. When the verification file is not consistent with the task process information recorded on the computer, the computer re-executes the task. In this way, when a large number of external USB slave devices are connected to the master device and there is a slave device abnormally disconnected from the master device, the interrupted slave device can be found as soon as possible, and the re-establishment of the connection between the slave device and the master device may be tried, so that after the connection is successfully re-established, the slave device can automatically resume the communication with the master device without attendance. By re-enumerating the interrupted slave device, the technical problem of abnormal disconnection of the external USB slave device from the master device caused by problems such as the power supply problem of the main board of the master device and the stability problem of the operating system can be solved. In a scenario with a large number of devices, the user can quickly find a host port connected to an abnormal device based on the abnormal device, thereby quickly troubleshooting the problem.

Example Embodiment Five

The method for searching for an interrupted device of the present disclosure achieves the effect that when a large number of external USB slave devices are abnormally disconnected from a master device, the interrupted slave devices can be found as soon as possible. For ease of understanding, the method for searching for an interrupted device of the present disclosure will be described below with reference to an application scenario. In this application scenario, the slave devices are mobile phones, and the master device is a PC.

Figure 8:
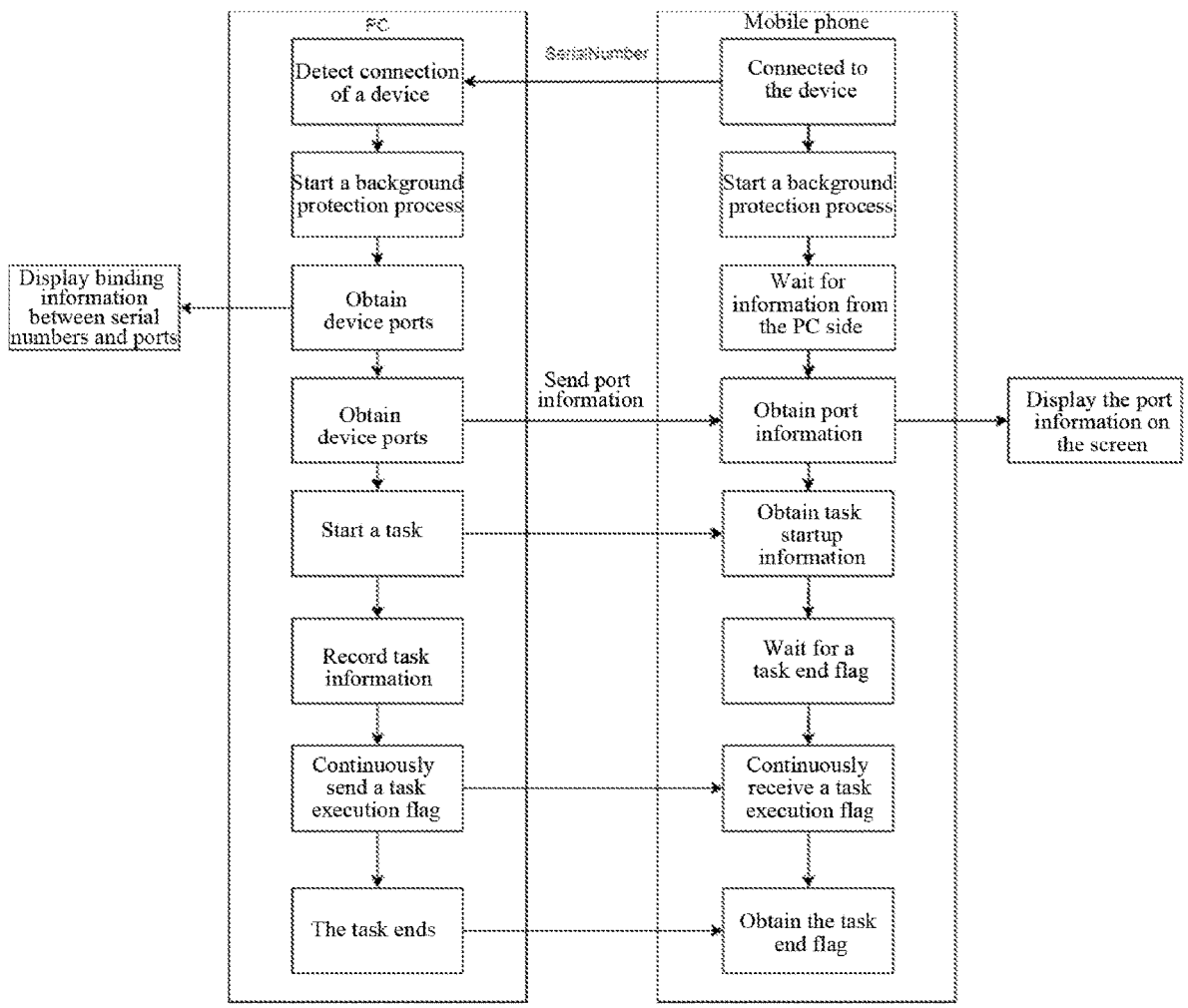
FIG. 8 is a flowchart of a method for normally connecting a device according to Example Embodiment Five of the present disclosure.

FIG. 8 is a flowchart of a method for normally connecting a device according to Example Embodiment Five of the present disclosure. The method includes the following steps S801 to S813.

At S801, mobile phones are connected to a hub device to be connected to a PC, and a background protection process on the mobile phone side is started.

At S802, the PC detects the connection of the mobile phones, and starts a background protection process on the PC side.

At S803, the PC obtains and binds serial numbers of the mobile phones and port information of corresponding ports of the hub device through which the mobile phones are connected to the hub device.

In this embodiment, the PC binds and displays the serial numbers and the port information on a screen of the PC.

At S804, the PC respectively sends the port information to the mobile phones connected to corresponding ports.

At S805, each of the mobile phones receives and displays the corresponding port information.

At S806, the PC starts a task and sends startup information to the protection process on the mobile phone side.

At S807, the mobile phone obtains the startup information.

At S808, the PC records task information, including a path of a file to be copied, a copying process, and a process of controlling the mobile phone.

At S809, the mobile phone waits for a task end flag.

At S810, the PC continuously sends a task execution flag to the mobile phone.

The task execution flag includes: latest file size information recorded, file binary code, and task information.

At S811, the mobile phone receives the task execution flag.

At S812, the PC has completed the execution of the task, i.e., the task ends, and the PC sends a task end flag.

At S813, the mobile phone receives the task end flag.

Figure 9:
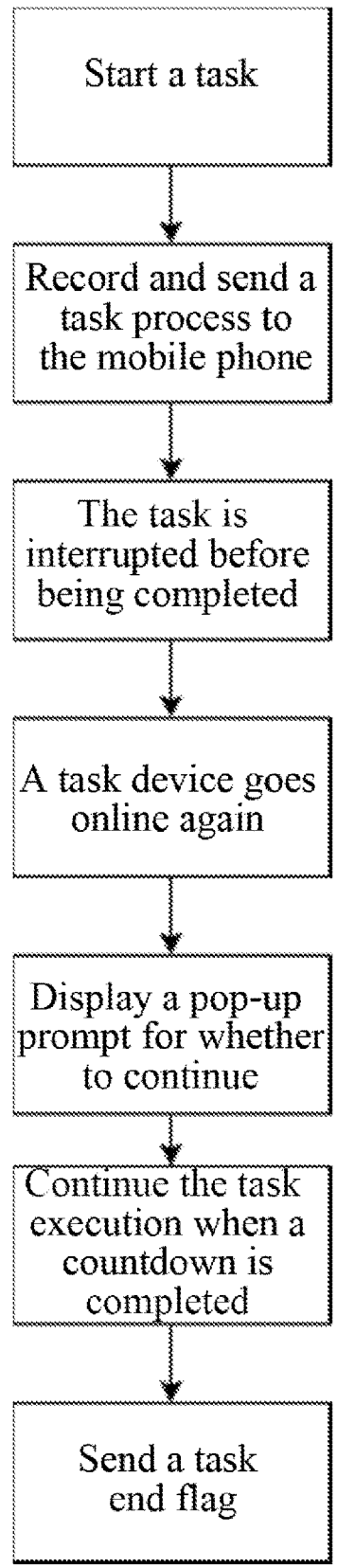
FIG. 9 is a flowchart of an implementation on a personal computer (PC) side when a mobile phone is abnormally disconnected from a PC according to Example Embodiment Five of the present disclosure.

An implementation on the PC side when the mobile phone is abnormally disconnected from the PC is shown in FIG. 9.

At S901, a task is started.

At S902, a task process is continuously recorded, for example, an $n^{th}$ step or $xxx^{th}$ byte, and is sent to the mobile phone.

At S903, the task is interrupted before being completed.

At S904, after a task device goes online (it is determined according to a serial number of the task device whether the task device is the device that has not completed the task), a pop-up prompt indicating whether to continue or terminate is displayed and a countdown is triggered.

At S905, if the countdown is terminated by clicking, the task is ended.

At S906, the task is continued after the countdown is completed.

At S907, after the task ends, the PC sends a task end flag.

Figure 10:
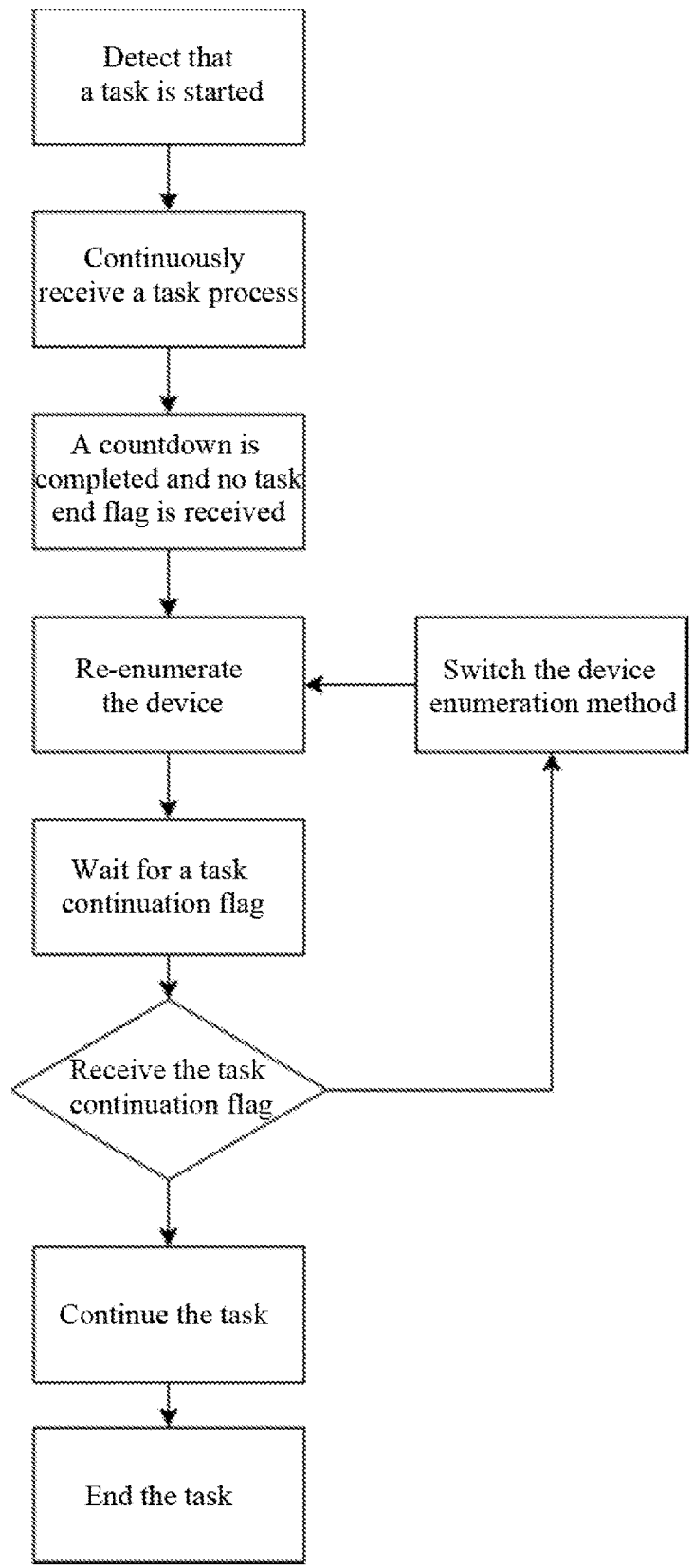
FIG. 10 is a flowchart of an implementation on a mobile phone side when a mobile phone is abnormally disconnected from a PC according to Example Embodiment Five of the present disclosure.

An implementation on the mobile phone side when the mobile phone is abnormally disconnected from the PC is shown in FIG. 10.

At S1001, a message indicating that a task is started on the PC side task is received.

At S1002, a task process is continuously recorded, for example, an $n^{th}$ step or $xxx^{th}$ byte.

At S1003, the mobile phone is interrupted when no task completion flag is received.

At S1004, the device is re-enumerated.

At S1005, if a task continuation flag is received after the re-enumeration, the task continues; if the task continuation flag is not received, the device is re-enumerated.

At S1006, the task is continued after the task continuation flag is received.

At S1007, the task ends.

At S1008, after the task ends, the mobile phone sends a task end flag.

In this embodiment, mobile phones are connected to a PC through a hub. The PC obtains port information of ports of the connection device through which the mobile phones are correspondingly connected to the computer and serial numbers of the mobile phones corresponding to the port information, and displays information indicating the binding between the port information and the serial numbers of the corresponding mobile phones on a screen of the computer. Then, the computer starts tasks, records task process information of the tasks executed by the mobile phones and the computer, and sends the task process information of the tasks executed by the computer and the corresponding mobile phones to the mobile phones respectively. When there is a mobile phone abnormally interrupted from the computer, the computer waits for the interrupted mobile phone to reconnect to the computer. After the interrupted mobile phone successfully reconnects to the computer, a selection box or a countdown box is displayed on the computer. After the user chooses to continue the task or the countdown is completed, the computer continues the task from an interruption point until the task ends, and sends a task end flag to the interrupted mobile phone. In this way, when a large number of external USB slave devices are connected to the master device and there is a slave device abnormally disconnected from the master device, the interrupted slave device can be found as soon as possible, and the re-establishment of the connection between the slave device and the master device may be tried automatically, so that after the connection is successfully re-established, the slave device can automatically resume the communication with the master device without attendance. In a scenario with a large number of devices, the user can quickly find a host port connected to an abnormal device based on the abnormal device, thereby quickly troubleshooting the problem.

Example Embodiment Six

The present disclosure provides an external USB slave device, to solve the technical problem that when a large number of slave devices are connected to a master device and an external USB slave device is abnormally disconnected from the master device, the interrupted slave device cannot be found as soon as possible. The external USB slave device provided in the present disclosure will be described below with reference to embodiments.

Figure 11:
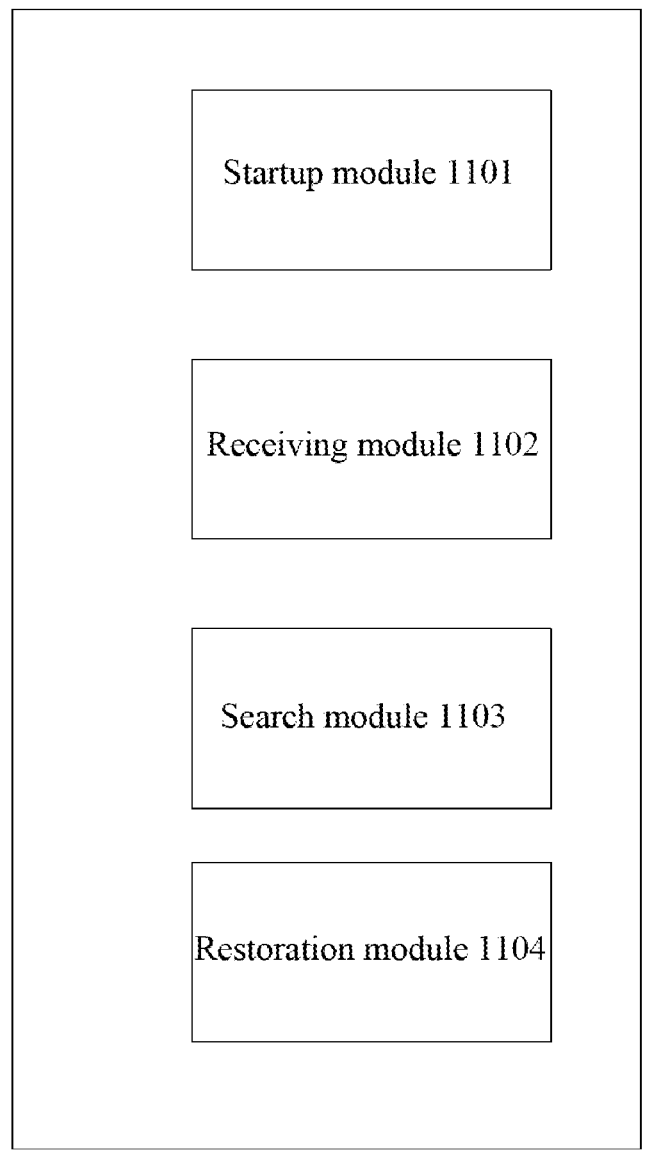
FIG. 11 is a schematic structural diagram of an external USB slave device according to Example Embodiment Six of the present disclosure.

Referring to FIG. 11, FIG. 11 is a schematic structural diagram of an external USB slave device according to Example Embodiment Six of the present disclosure. The slave device includes a startup module 1101, a receiving module 1102, and a search module 1103. The number of slave devices is at least two.

The startup module 1101 is configured for connecting to a master device through a connection device. The connection device includes at least two ports.

The receiving module 1102 is configured for receiving task process information of tasks executed by the master device and the corresponding slave devices from the master device. The task process information includes: latest file size information recorded, file binary code, and task information.

The search module 1103 is configured for, when the receiving of task process information sent by the master device is interrupted, finding at least one interrupted slave device according to the interrupted task process information.

In some embodiments, the slave device further includes a restoration module 1104. The restoration module 1104 is configured for restoring a connection between the interrupted slave device and the master device after the at least one interrupted slave device is found according to the interrupted task process information and re-enumeration is performed by the interrupted slave device or by an external device.

The external USB slave device may be a mobile phone, a camera, a printer, a smart watch, a tablet computer, etc. These devices are merely examples, and the above slave devices are not limited thereto. The number of slave devices in this embodiment is at least two. The connection device may be a hub or an OTG connector. The connection device includes at least two ports configured for connecting the slave devices.

In some embodiments, the receiving module 1102 may further be configured for receiving port information of ports of the connection device through which the slave devices are connected to the master device. After the port information is received, the port information may be displayed on a screen of the slave device, so that the user can easily find a corresponding port.

In some embodiments, the task process information sent by the master device is received in at least one of the following manners: an MTP mode, an ADB mode, Wi-Fi, a USB transfer control command or SCSI command, or a connection to the master device through a virtual RNDIS port of the slave device. In this way, by adding a communication protocol based on the USB protocol, both the master device and the slave devices can obtain a status of a task, for example, the task being in progress or the task having been completed. If the master device is disconnected from the slave device before the task is executed, there is no need to restart the task after the connection is automatically restored. If the master device is disconnected from the slave device during execution of the task, the task may be re-executed after the connection is automatically restored.

Re-enumerating by the interrupted slave device includes: switching a connection mode between the interrupted slave device and the master device; or, pulling down an electrical level of a Digital Positive (DP) signal line; or controlling the connection between the master device and the interrupted slave device through a digital relay in the interrupted slave device. The switched connection mode between the interrupted slave device and the master device may be one of the following: charging only, MTP mode, file transfer, image transfer, etc. The pulling down the level of the DP signal line may be forcibly pulling down the level through a USB controller of the slave device. The digital relay that controls the connection between the master device and the interrupted slave device may be integrated in the slave device, or may be a digital relay externally connected to the slave device.

In some embodiments, when the receiving of the task process information sent by the master device is interrupted, a detection is made as to whether the task process information of the interrupted slave device includes charging information only, and if yes, there is no need to re-enumerate the interrupted slave device. In this way, the slave device that is disconnected from the master device can automatically determine whether to re-establish a connection with the master device such as a PC. If the slave device is not executing a task with the PC, for example, charging only, the slave device does not need to re-establish a connection with the PC.

In some embodiments, the interruption of the receiving of the task process information from the master device includes: no task process information has been received from the master device within a preset time.

In some embodiments, when the interrupted slave device has been re-enumerated multiple times in multiple manners but the connection between the interrupted slave device and the master device is still not restored, the port information of the port through which the interrupted slave device is connected to the connection device may be displayed on the screen of the slave device to prompt the user, so that the user can take a corresponding action in a timely manner to solve technical problems caused by physical disconnection. A sound alarm may also be emitted when the connection with the master device is still not established after repeated enumerations.

In some embodiments, after the interrupted slave device is re-enumerated and the connection between the interrupted slave device and the master device is restored, the slave device continues to receive the task process information from the master device, and resumes the task from an interruption point. After completing the task, the slave device sends all obtained task process information to the master device, for verification by the master device. If the verification is successful, the master device terminates the task. If the verification fails, the task is re-executed, and task process information is sent to the slave device again. The completion of the task may be determined by a flag indicating completion of task execution received from the master device. When the slave device is connected to the master device through an OTG connector, the master device may record whether the task is completed, and the slave device re-executes the task when the connection is re-established.

In the slave device provided in the embodiments of the present disclosure, slave devices are connected to a master device through a connection device, and the slave devices receive task process information of tasks executed by the master device and the corresponding slave devices from the master device, so as to achieve effects including, but not limited to, that when a large number of external USB slave devices are abnormally disconnected from the master device, faults, i.e., the interrupted slave devices, can be found as soon as possible.

Example Embodiment Seven

The present disclosure provides a master device, to solve the technical problem that when a large number of slave devices are connected to a master device and an external USB slave device is abnormally disconnected from the master device due to various reasons such as the power supply problem of the main board of the master device and the stability problem of the operating system, the interrupted slave device cannot be found as soon as possible. The master device provided in the present disclosure will be described below with reference to embodiments.

Figure 12:
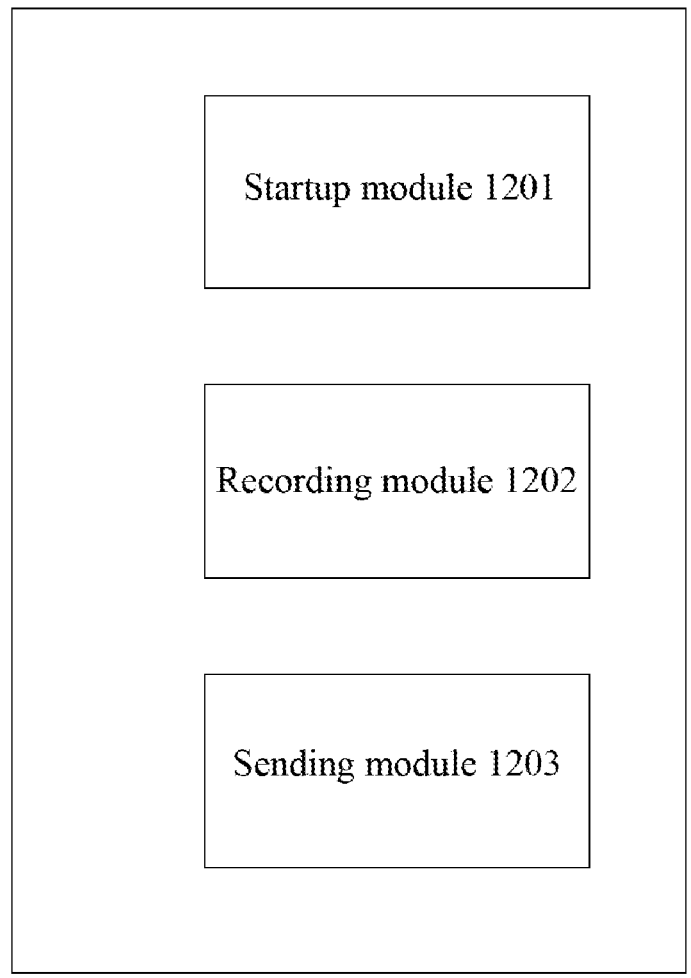
FIG. 12 is a schematic structural diagram of a master device according to Example Embodiment Seven of the present disclosure.

Referring to FIG. 12, FIG. 12 is a schematic structural diagram of a master device according to Example Embodiment Seven of the present disclosure. The master device includes a startup module 1201, a recording module 1202, and a sending module 1203.

The startup module 1201 is configured for connecting slave devices through a connection device.

The recording module 1202 is configured for recording task process information of tasks executed by the slave devices and the master device.

The sending module 1203 is configured for sending the task process information of the tasks executed by the master device and the corresponding slave devices to the slave devices respectively.

The master device may be a mobile phone, a smart watch, a computer, etc. These devices are merely examples, and the above master device is not limited thereto. The connection device may be a hub or an OTG connector.

In some embodiments, after the slave devices are connected through the connection device, a protection process may be started. The recording module 1202 may further be configured for: obtaining port information of ports of the connection device through which the slave devices are correspondingly connected to the master device; and respectively sending the port information to the slave devices connected to the corresponding ports. The obtained port information of the ports of the connection device through which the slave devices are correspondingly connected to the master device may be displayed on a screen of the master device.

In some embodiments, obtaining port information of ports of the connection device through which the slave devices are correspondingly connected to the master device may further include: obtaining the port information and serial numbers of the slave devices corresponding to the port information; and binding the port information to the serial numbers of the corresponding slave devices and storing the bound port information and serial numbers in the master device. Information indicating the binding between the port information and the serial numbers of the corresponding slave devices may also be displayed on the screen of the master device. In some embodiments, after the port information and serial numbers of the slave devices corresponding to the port information are obtained, and the port information and the serial numbers of the corresponding slave devices are bound and stored in the master device, the recording task process information of tasks executed by the slave devices and the master device may further include: binding the serial numbers of the corresponding slave devices and the port information respectively to the task process information corresponding to the tasks; and finding, by the slave devices, an interrupted slave device according to received task information when the task process information sent by the master device is interrupted further includes: finding, by the master device, the interrupted slave device according to the recorded task process information.

In some embodiments, when recording of the task process information of tasks executed by a slave device and the master device is abnormally interrupted, connection restoring between the interrupted slave device and the master device is waited for. That the recording of the task process information of tasks executed by a slave device and the master device is abnormally interrupted means that there is a slave device abnormally interrupted from the master device. When the connection between the interrupted slave device and the master device is restored, a selection box or a countdown prompt box is displayed on the master device.

A condition for determining whether the connection between the interrupted slave device and the master device is restored may be: obtaining the serial number of the re-connected slave device, comparing the serial number with a serial number of a slave device that has not completed the task before to determine whether the two serial numbers are the same; and if yes, displaying the selection box or the countdown prompt box on the master device. The selection box may present prompts as to whether to continue or terminate. The countdown prompt is for the purpose of automatically continuing the task. It may be set that the task is continued automatically after the countdown is completed. When the task is automatically continued after the countdown is completed, the master device continues to record task process information in real time and send the task process information to the slave device in real time or according to a preset period, until the task ends. When the task ends, a task end flag may be sent to the slave device.

In some embodiments, the master device further includes a verification module. The verification module is configured for receiving a verification file of the slave device after the task end flag is sent to the slave device. The verification file is task process data received by the slave device from the master device. The master device compares the verification data with task process data recorded by the master device. If the verification data is consistent with the task process data, the task ends. If the verification data is not consistent with the task process data, the task is re-executed.

According to the master device provided in the embodiments of the present disclosure, slave devices are connected to the master device through a connection device, the master device records, in real time, task process information of tasks executed by the slave devices and the master device, and the master device sends the task process information of the tasks executed by the master device and the corresponding slave devices to the slave devices respectively, so that the slave devices can find the interrupted slave device based on whether the task process information is updated, so as to achieve effects including, but not limited to, that when a large number of external USB slave devices are abnormally disconnected from the master device, the interrupted slave devices can be found as soon as possible.

Example Embodiment Eight

The present disclosure provides an external USB slave device, to solve the technical problem that when a large number of slave devices are connected to a master device and an external USB slave device is abnormally disconnected from the master device due to various reasons such as the power supply problem of the main board of the master device and the stability problem of the operating system, the interrupted slave device cannot be found as soon as possible. The slave device provided in the present disclosure will be described below with reference to embodiments.

Figure 13:
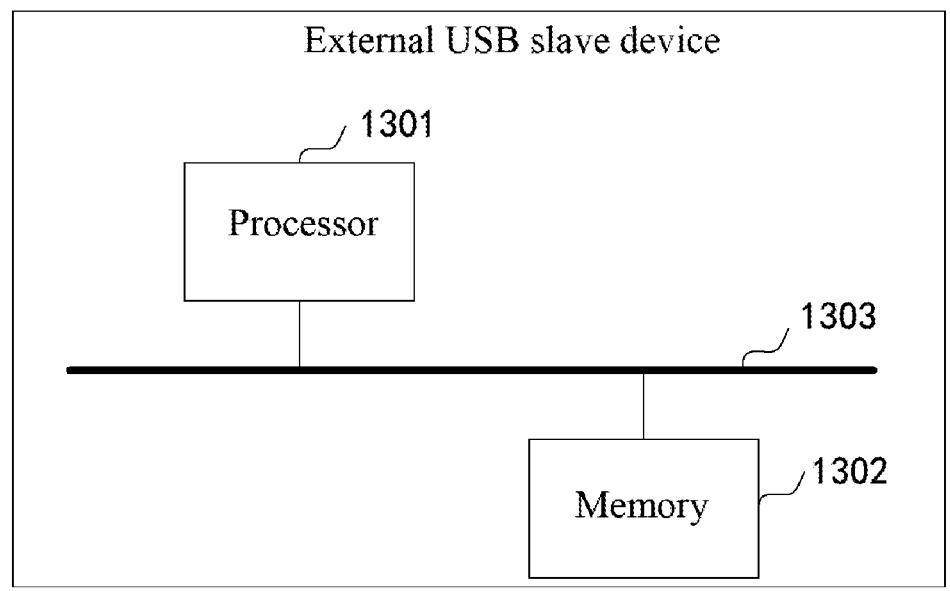
FIG. 13 is a schematic structural diagram of an external USB slave device according to Example Embodiment Eight of the present disclosure.

Referring to FIG. 13, FIG. 13 is a schematic structural diagram of a slave device according to Example Embodiment Eight. The slave device includes a processor 1301, a memory 1302, and a communication bus 1303.

The communication bus 1303 is configured for implementing connection and communication between the processor 1301 and the memory 1302.

The processor 1301 is configured for executing one or more computer programs stored in the memory 1302 to implement at least one step in the method for searching for an interrupted device in the above Example Embodiment One or Example Embodiment Two.

According to an embodiment of the present disclosure, a computer-readable storage medium is further provided. The computer-readable storage medium includes volatile or non-volatile, removable or non-removable media implemented in any method or technology for storage of information (such as computer readable instructions, data structures, computer program modules, or other data). The computer-readable storage medium includes, but not limited to, a random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette, a magnetic tape, a magnetic disk storage or other magnetic storage device, or any other medium which can be used to store the desired information and which can be accessed by a computer.

The computer-readable storage medium in this embodiment may be configured for storing one or more computer programs which, when executed by a processor, cause the processor to implement at least one step in the method for searching for an interrupted device in the above Example Embodiment One or Example Embodiment Two.

Example Embodiment Nine

The present disclosure provides a master device, to solve the technical problem that when a large number of slave devices are connected to a master device and an external USB slave device is abnormally disconnected from the master device due to various reasons such as the power supply problem of the main board of the master device and the stability problem of the operating system, the interrupted slave device cannot be found as soon as possible. The master device provided in the present disclosure will be described below with reference to embodiments.

Figure 14:
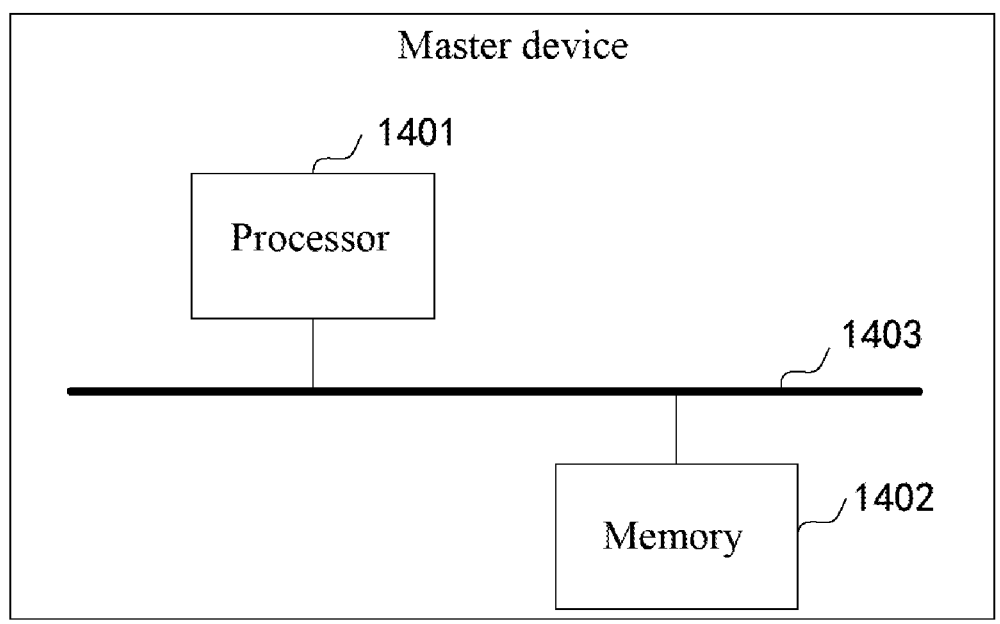
FIG. 14 is a schematic structural diagram of a master device according to Example Embodiment Nine of the present disclosure.

Referring to FIG. 14, FIG. 14 is a schematic structural diagram of a slave device according to Example Embodiment Nine. The slave device includes a processor 1401, a memory 1402, and a communication bus 1403.

The communication bus 1403 is configured for implementing connection and communication between the processor 1401 and the memory 1402.

The processor 1401 is configured for executing one or more computer programs stored in the memory 1402 to implement at least one step in the method for searching for an interrupted device in the above Example Embodiment Three or Example Embodiment Four.

According to the method for searching for an interrupted device, the slave device, the master device, and the storage medium provided in the embodiments of the present disclosure, slave devices are connected to a master device through a connection device, and the slave devices receive task process information of tasks executed by the master device and the corresponding slave devices from the master device, so as to achieve effects including, but not limited to, that when a large number of external USB slave devices are abnormally disconnected from the master device, the interrupted slave devices can be found as soon as possible in some implementation processes to facilitate troubleshooting by the user, thereby improving the efficiency of troubleshooting.

According to an embodiment of the present disclosure, a computer-readable storage medium is further provided. The computer-readable storage medium includes volatile or non-volatile, removable or non-removable media implemented in any method or technology for storage of information (such as computer readable instructions, data structures, computer program modules, or other data). The computer-readable storage medium includes, but is not limited to, a random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette, a magnetic tape, a magnetic disk storage or other magnetic storage device, or any other medium which can be used to store the desired information and which can be accessed by a computer.

The computer-readable storage medium in this embodiment may be configured for storing one or more computer programs which, when executed by a processor, cause the processor to implement at least one step in the method for searching for an interrupted device in the above Example Embodiment Three or Example Embodiment Four.

Therefore, those having ordinary skills in the art can understand that all or some of the steps in the methods disclosed above and the functional modules/units in the system and the apparatus can be implemented as software (which may be implemented by a computer program code executable by a computing device), firmware, hardware, and appropriate combinations thereof. In a hardware implementation, the division of the functional modules/units mentioned in the above description does not necessarily correspond to the division of physical components. For example, one physical component may have multiple functions, or one function or step may be jointly executed by several physical components. Some or all physical components may be implemented as software executed by a processor, such as a central processing unit, a digital signal processor, or a microprocessor, or as hardware, or as an integrated circuit, such as an application-specific integrated circuit.

In addition, as is known to those having ordinary skills in the art, the communication medium typically includes computer-readable instructions, data structures, computer program modules, or other data in a modulated data signal such as a carrier or other transport mechanism, and may include any information passing medium. Therefore, the present disclosure is not limited to any particular combination of hardware and software.

The foregoing is a further detailed description of the present disclosure in conjunction with specific embodiments, and it should not be considered that the specific implementation of the present disclosure is limited thereto. Some simple deductions or replacements can be made by those having ordinary skills in the art to which the present disclosure pertains without departing from the conception of the present disclosure, which are all regarded as falling within the protection scope of the present disclosure.

What is claimed is:

1. A method for searching for an interrupted device, which is applicable to a slave device, the method comprising:
   connecting to a master device through a port of a connection device;
   receiving port information of the port of the connection device and task process information sent by the master device, wherein the task process information comprises: recorded task process information that is recorded when the master device and the slave device is executing a task, and the task process information is bound with the port information and a serial number of the slave device; and
   in response to an interruption of the task process information sent by the master device, determining that the slave device is an interrupted slave device according to the interrupted task process information.

2. The method for searching for an interrupted device of claim 1, wherein the task process information sent by the master device is received in at least one of the following manners:
   a Media Transfer Protocol (MTP) mode,
   an Android Debug Bridge (ADB) mode,
   Wi-Fi,
   a USB transfer control command or Small Computer System Interface (SCSI) command, or
   a connection to the master device through a virtual Remote Network Driver Interface Specification (RNDIS) port of the slave device.

3. The method for searching for an interrupted device of claim 1, further comprising:
   after determining that the slave device is an interrupted slave device according to the interrupted task process information, re-enumerating, by the interrupted slave device or by an external device, the interrupted slave device to restore a connection between the interrupted slave device and the master device.

4. The method for searching for an interrupted device of claim 3, wherein the re-enumerating by the interrupted slave device comprises:
   switching a connection mode between the interrupted slave device and the master device; or,
   pulling down an electrical level of a Digital Positive (DP) signal line; or
   controlling the connection between the master device and the interrupted slave device through a digital relay in the interrupted slave device.

5. A method for searching for an interrupted device, which is applicable to a master device, the method comprising:
   connecting slave devices through respective ports of a connection device;
   obtaining port information of each of the ports of the connection device and a serial number of a respective one of the slave devices;
   binding the port information to the serial number of the respective slave device and storing the bound port information and serial number in the master device;
   sending the port information of each of the ports to a respective one of the slave devices;
   recording task process information of a task executed by each of the slave devices and the master device, comprising:
      binding the serial number of each of the slave devices and the respective port information to the task process information corresponding to the task; and
   sending, to each of the slave devices respectively, the task process information of the task executed by each of the slave devices and the master device,
      wherein the task process information sent to each of the slave devices respectively is used for finding, according to the recorded task process information, an interrupted slave device, in response to an interruption of the task process information sent by the master device.

6. The method for searching for an interrupted device of claim 5, further comprising:
   in response to recording of the task process information of a task executed by a slave device and the master device being abnormally interrupted, waiting for the interrupted slave device to restore a connection with the master device; and in response to the connection between the interrupted slave device and the master device being restored, displaying a selection box or a countdown prompt box on the master device.

7. An external USB slave device, comprising a processor, a memory, and a communication bus, wherein:
   the communication bus is configured for implementing connection and communication between the processor and the memory; and
   the processor is configured for executing one or more computer programs stored in the memory to perform the method for searching for an interrupted device of claim 1.

8. A master device, comprising a processor, a memory, and a communication bus, wherein
   the communication bus is configured for implementing connection and communication between the processor and the memory; and
   the processor is configured for executing one or more computer programs stored in the memory to perform the method for searching for an interrupted device of claim 6.

9. A non-transitory computer-readable storage medium, storing one or more computer programs which, when executed by one or more processors, cause the one or more processors to perform the method for searching for an interrupted device of claim 1.

10. A non-transitory computer-readable storage medium, storing one or more computer programs which, when executed by one or more processors, cause the one or more processors to perform the method for searching for an interrupted device of claim 5.

11. The method for searching for an interrupted device of claim 1, further comprising:
   after determining that the slave device is an interrupted slave device according to the interrupted task process information,
      re-enumerating, by the interrupted slave device or by an external device, the interrupted slave device to restore a connection between the interrupted slave device and the master device.

12. The method for searching for an interrupted device of claim 2, further comprising:
   after determining that the slave device is an interrupted slave device according to the interrupted task process information,
      re-enumerating, by the interrupted slave device or by an external device, the interrupted slave device to restore a connection between the interrupted slave device and the master device.

\* \* \* \* \*